United States Patent Office 3,740,403
Patented June 19, 1973

3,740,403
3,6-BIS-(DIALKYLAMINOALKOXY)ACRIDINES
Keith Chadwick Murdock, Pearl River, N.Y., assignor to American Cyanamid Company, Stamford, Conn.
No Drawing. Filed Nov. 5, 1971, Ser. No. 196,222
Int. Cl. C07d 37/24
U.S. Cl. 260—279 R               9 Claims

ABSTRACT OF THE DISCLOSURE

This disclosure describes compounds of the class of 3,6-bis-(dialkylaminoalkoxy)acridines useful as antiviral agents.

BRIEF SUMMARY OF THE INVENTION

This invention relates to new organic compounds and, more particularly, is concerned with novel 3,6-bis-(dialkylaminoalkoxy)acridines and with methods of preparing these compounds. The novel compounds of the present invention may be represented by the following general formula:

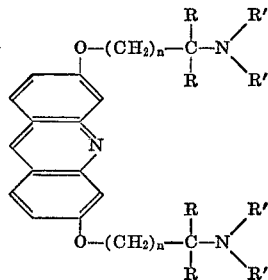

wherein $n$ is an integer selected from the group consisting of 1 and 2, R is hydrogen or methyl, and R' is a lower alkyl group having up to 4 carbon atoms such as methyl, ethyl, isopropyl, sec-butyl, and the like.

DETAILED DESCRIPTION OF THE INVENTION

The novel compounds of the present invention are generally obtainable as yellow crystalline materials having characteristic melting points and absorption spectra and appreciable solubility in organic solvents such as dimethylformamide, ethanol, diethyl ether, and chloroform. However, they are generally insoluble in water and petroleum ether.

The novel 3,6-bis-(dialkylaminoalkoxy)acridines of the present invention form acid-addition salts with a variety of pharmaceutically acceptable organic and inorganic salt-forming reagents. Thus, acid-addition salts, formed by admixture of the 3,6-bis-(dialkylaminoalkoxy) acridine free base with one, two or three equivalents of an acid, suitably in a neutral solvent, are formed with such acids as sulfuric, phosphoric, hydrochloric, hydrobromic, nitric, citric, lactic, tartaric, acetic, and related acids. For purposes of the present invention, the 3,6-bis-(dialkylaminoalkoxy)acridine free bases are equivalent to their non-toxic acid-addition salts.

The novel 3,6-bis-(dialkylaminoalkoxy)acridines of the present invention may be readily prepared by treating one mole of the disodio derivative of 3,6-acridinediol with 2 moles of an alkyl halide of the following general formula:

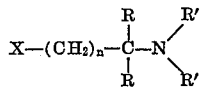

wherein X is chloro or bromo and R and R' are as hereinabove defined. This reaction is preferably carried out in an inert solvent such as dimethylformamide at a temperature of 75°–100° C. for a period of time of an hour or more. The product may be isolated by removing the inert solvent from the reaction mixture by evaporation, taking up the residue in water, and extracting the aqueous phase with diethyl ether. The evaporation of the diethyl ether provides the product which may then be purified by column chromatography. The disodio derivatives of 3,6-acridinediol may be readily prepared by treating 3,6-acridinediol with sodium hydride at room temperature in an inert solvent such as dimethylformamide for a period of time of 15 minutes to half an hour. The thus formed disodio derivative of 3,6-acridinediol may then be used directly in situ.

The antiviral utility of the novel compounds of the present invention is demonstrated by their ability to control lethal viral infections in mice since they show significant antiviral activity in mice against Columbia SK virus. In this test procedure, Taconic Farms male white mice (18–24 grams) were treated by gavage 18 hours before infection with the indicated weight of compound suspended or dissolved in 1.0 ml. of 0.2% aqueous agar solution. The mice were then infected by subcutaneous injection with one $LD_{95}$ of Columbia SK virus in a 0.2-ml. volume of distilled water. Groups of infected, untreated mice were used as controls to show the lethality of the infection. In a representative operation, and merely by way of illustration, the survival ratio of typical compounds of this invention against Columbia SK virus as determined in the above-described assay are set forth in Table I below. The survival ratio indicates the number of mice surviving at 7 days after infection divided by the initial number of mice in that group.

TABLE I

| Compound | Dose, mg./mouse | Survival ratio of— | |
|---|---|---|---|
| | | Treated | Controls |
| 3,6-bis-(2-diethylaminoethoxy)acridine hydrochloride | 8 | 10/15 | 2/15 |
| Do | 4 | 7/15 | 2/15 |
| 3,6-bis-(3-dimethylaminopropoxy)-acridine | 8 | 5/15 | 2/15 |
| 3,6-bis-(2-dimethylaminoethoxy)acridine | 8 | 10/15 | 2/15 |
| 2,7-bis-(2-diethylaminoethoxy)phenazine | 8 | 5/15 | 0/15 |
| Do | 8 | 5/15 | 0/15 |
| Do | 4 | 6/15 | 0/15 |
| 3,6-bis-(2-dimethylamino-2-methyl-propoxy)acridine trihydrochloride | 8 | 5/15 | 0/15 |
| 3,6-bis-2-di-n-butylaminoethoxy)acridine trihydrochloride | 8 | 5/15 | 0/15 |

The invention will be described in greater detail in conjunction with the following specific examples.

EXAMPLE I

Preparation of 3,6-bis-(2-dimethylaminoethoxy) acridine

A 50% emulsion of sodium hydride in mineral oil (5.76 g., 0.12 mole) was freed of mineral oil by decantation with three portions of petroleum ether. Dry dimethylformamide (100 ml.) and 6.34 g. (0.03 mole) of dried (120°/0.1 mm./1.5 hr./P$_2$O$_5$) 3,6-acridinediol (L. Benda, Ber. 45, 1787 (1912)) were added and the mixture stirred until (20 min.) gas evolution appeared to be complete. 2-dimethylaminethyl chloride hydrochloride (8.64 g., 0.06 mole) was added and the mixture stirred and heated at 100±2° for 1 hour. Solvent was removed by evaporation, finally at 100°/0.1 min. The residue was washed with 4× 100 ml. of ether. These ethereal extracts were passed through a column containing 130 g. of alumina. The column was developed with 300 ml. of ether, then eluted first with 1.3 l. of ether/ethyl acetate, 4/1, then with 250 ml. of ethyl acetate, stopping when an orange band began to be eluted. The crystalline residue from evaporation of the eluates was recrystallized from heptane to give 2.45 g. of pale yellow crystals, M.P. 103°–104° C.

EXAMPLE II

Preparation of 3,6-bis-(2-diethylaminoethoxy)acridine trihydrochloride

The reaction mixture from 4.65 g. (0.022 mole) of 3,6-acridinediol, 0.088 mole of NaH and 7.57 g. (0.044 mole) of 2-diethylaminoethyl chloride hydrochloride in 50 ml. of dimethylformamide was stirred at 100±2° C. for 1.0 hr., cooled, then poured into 300 ml. of water. The mixture was extracted with 3× 100 ml. of ether, the dried (MgSO₄) extracts were evaporated to dryness and the residue extracted with 50 ml. of petroleum ether (B.P. 30–60° C.). Evaporation of this extract left a crystalline residue (5.08 g.) which was dissolved in 50 ml. of absolute ethanol and treated with 3.31 ml. of 7.5 M ethanolic hydrogen chloride. The resulting crystals were collected, washed first with a minimum of cold, absolute ethanol, then with acetone. This material crystallized slowly from n-propanol to give 1.46 g. of tiny, gold-colored crystals, M.P. 225°–227° C. (dec.).

EXAMPLE III

Preparation of 3,6-bis(-3-dimethylaminopropoxy)acridine

From 6.34 g. (0.03 mole) of 3,6-acridinediol, 0.12 mole of NaH and 9.49 g. (0.06 mole) of 3-dimethylaminopropyl chloride hydrochloride was obtained a dried reaction residue which was washed with a total of 250 ml. of ether. The washes were then chromatographed on 130 g. of alumina. The fastest yellow band was eluted with just 220 ml. of acetone. Evaporation of the acetone left 10.47 g. of an oil which soon crystallized. Further elution with 50 ml. of acetone and evaporation of the acetone left 2.44 g. of a mobile, pale yellow oil which almost all distilled at 60°/.01 mm. to give a distillate with an infrared spectrum identical with that of diacetone alcohol. An undistilled, crystalline remainder (0.142 g.) plus the earlier crystals were recrystallized from petroleum ether, finally at 5° C., to give 5.68 g. of pale yellow leaflets, M.P. 90–91° C.

EXAMPLE IV

Preparation of 3,6-bis(2-dimethylamino-2-methylpropoxy)acridine trihydrochloride With 8.45 g. 0.04 mole) of 3,6-acridinediol, 0.16 mole of sodium hydride and 13.77 g. (0.08 mole) of 2-chloro-1,1,N,N-tetramethylethylamine hydrochloride (A. H. Becket and A. F. Casy, J. Pharm. Pharmacol. 6, 986 (1954)) the above procedure gave an evaporated reaction residue which was extracted with petroleum ether (B.P. 30–60° C.). This extract was chromatographed on alumina and eluted with CH₂Cl₂. Evaporation of the eluates left 1.11 g. of a yellow sirup which was dissolved in 15 ml. of methanol and treated with 105% of the theoretical amount of 10 N methanolic HCl. Crystallization was completed after adding 30 ml. of acetone. The product was collected, washed with acetone and recrystallized from methanol/acetone: 1.38 g., tiny, yellow-tan needles, M.P. 202°–204° C. (dec.). An n.m.r. spectrum of the product in deuterated dimethylsulfoxide+D₂O was consistent with the assigned structure rather than the product of an ethylenimmoninum rearrangement. In thin layer chromatography on alumina vs. CHCl₃-acetone, 9:1, the product had R$_f$ 0.53 with a bright blue fluorescence vs. UV light at 370 mμ. A similarly fluorescent material with R$_f$ 0.020 was eluted from the above column with Cl₂Cl₂-acetone, 19:1. This fraction also contained the product of R$_f$ 0.63 and was not investigated further.

EXAMPLE V

Preparation of 3,6-bis-(2-di-n-butylaminoethoxy)acridine trihydrochloride

Using the reaction procedure of Example I, 6.75 g. (0.032 mole) of acridinediol was allowed to react with 0.064 mole of NaH and 12.27 g. (0.064 mole) of freshly distilled 2-chloroethyl dibutylamine (J. H. Parkkari, R. A. Bannard and I. W. Coleman, Can. J. Chem. 43, 3119 (1965)). The crude product on an alumina column (200 g.) was developed with CH₂Cl₂ until the fastest yellow band reached the bottom of the column, then eluted with a total of just 80 ml. CH₂Cl₂, when a thin, brown band began to be eluted. Evaporation of solvent left a sirup (5.21 g.) with its strongest infrared absorption peak at 6.20μ. (Residues from subsequent eluates showed increasing strengths of a new peak at 5.87μ, so were rejected.) A solution of the sirup in 200 ml. of dry ether was treated with gaseous HCl until the resulting gummy solid had become finely granular. The mixture was allowed to stand overnight, the solid was collected, washed with ether, then allowed to stand in the open air until (4 hours) the odor of HCl was gone. The product was 6.60 g. of a sulfur-yellow solid, M.P. 138°–140° C.

EXAMPLE VI

Preparation of 2,7-phenazinediol

A suspension of 2.80 g. of 2,7-dimethoxyphenazine [I. Yosioka and H. Otomatsu, Pharm. Bull. (Japan) 1, 66 (1953)] in 50 ml. of 48% HBr in glacial acetic acid plus 25 ml. glacial acetic acid was stirred and heated under reflux for 17 hours. The dark suspension was cooled and gradually added to 1 l. of cold, N/1 NaOH solution. The resulting, dark red solution was extracted with CHCl₃ to remove any starting material, then weakly acidified (to disappearance of the red color) by adding 90 ml. glacial acetic acid. The resulting very finely divided solid was coagulated somewhat by boiling the suspension for 15 min. The solid was collected by filtration, but washed with water by centrifugation: 2.28 g., olive-drab color, unmelted by 360° C.

EXAMPLE VII

Preparation of 2,7-bis-(2-diethylaminoethoxy)phenazine

This reaction of 2.29 g. (0.0108 mole) of 2,7-phenazinediol, 0.0431 mole of NaH, and 3.70 g. (0.0215 mole) of 2-diethylaminoethyl chloride hydrochloride in 35 ml. of dimethylformamide paralleled the synthesis of 3,6-bis-(2 - dimethylaminoethoxy)acridine. The residue from evaporation of the reaction mixture was washed with CH₂Cl₂ and the washes were chromatographed on alumina. The column was developed with CH₂Cl₂ until a red substance had all eluted. A yellow band was then eluted with ethyl acetate. Evaporation of the ethyl acetate left 1.03 g. of yellow crystals which were recrystallized from heptane to give 0.81 g. of bright yellow plates, M.P. 117°–118° C.

I claim:

1. A compound selected from the group consisting of those of the formula:

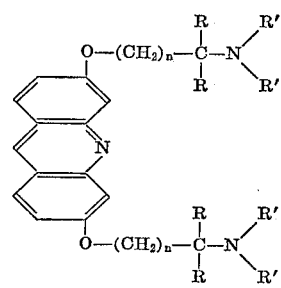

wherein $n$ is an integer selected from the group consisting of 1 and 2, R is selected from the group consisting of hydrogen and methyl, and R' is lower alkyl; and the pharmacologically acceptable acid-addition salts thereof.

2. A compound according to claim 1 wherein $n$ is 1, R is hydrogen, and R' is methyl; 3,6-bis(2-dimethylaminoethoxy)acridine.

3. A compound according to claim 1 wherein $n$ is 1, R is hydrogen, and R' is ethyl; 3,6-bis-(2-diethylaminoethoxy)acridine.

4. A compound according to claim 1 wherein $n$ is 2, R is hydrogen, and R' is methyl; 3,6-bis-(3-dimethylaminopropoxy)acridine.

5. A compound according to claim 1 wherein $n$ is 1, R is methyl, and R' is methyl; 3,6-bis-(2-dimethylamino-2-methylpropoxy)acridine.

6. A compound according to claim 1 wherein $n$ is 1, R is hydrogen, and R' is n-butyl; 3,6-bis-(2-di-n-butylaminoethoxy)acridine.

7. A compound according to claim 1 wherein $n$ is 2, R is methyl, and R' is ethyl; 3,6-bis-(3-diethylamino-3-methyl-n-butoxy)acridine.

8. A compound according to claim 1 wherein $n$ is 2, R is methyl, and R' is n-propyl; 3,6-bis-(3-di-n-propylamino-3-methyl-n-butoxy)acridine.

9. A compound according to claim 1 wherein $n$ is 2, R is hydrogen, and R' is n-butyl; 3,6-bis-(3-di-n-butylaminopropoxy)acridine.

References Cited

UNITED STATES PATENTS

| 1,715,333 | 5/1929 | Benda | 260—279 |
| 1,863,647 | 6/1932 | Benda | 260—279 |

DONALD G. DAUS, Primary Examiner

U.S. Cl. X.R.

260—267; 424—250, 257

Disclaimer

3,740,403.—*Keith Chadwick Murdock*, Pearl River, N.Y. 3,6-bis-(DIALKYL-AMINOALKOXY)ACRIDINES. Patent dated June 19, 1973. Disclaimer filed July 18, 1980, by the assignee, *American Cyanamid Company*.

Hereby enters this disclaimer to claim 3 of said patent.

[*Official Gazette October 21, 1980.*]